United States Patent
Ito et al.

(10) Patent No.: US 7,113,616 B2
(45) Date of Patent: Sep. 26, 2006

(54) OBJECT TRACKING METHOD AND APPARATUS USING TEMPLATE MATCHING

(75) Inventors: Wataru Ito, Kodaira (JP); Shinya Ogura, Kodaira (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 720 days.

(21) Appl. No.: 10/309,231

(22) Filed: Dec. 4, 2002

(65) Prior Publication Data

US 2003/0103648 A1 Jun. 5, 2003

(30) Foreign Application Priority Data

Dec. 5, 2001 (JP) ............... 2001-371612

(51) Int. Cl.
*G06K 9/00* (2006.01)
(52) U.S. Cl. .................................... 382/103
(58) Field of Classification Search ............ None
See application file for complete search history.

(56) References Cited

U.S. PATENT DOCUMENTS

| | | | | |
|---|---|---|---|---|
| 6,724,421 B1* | 4/2004 | Glatt | ............ | 348/154 |
| 6,819,778 B1* | 11/2004 | Kamei | ............ | 382/103 |
| 6,867,799 B1* | 3/2005 | Broemmelsiek | ............ | 348/169 |
| 2001/0046309 A1* | 11/2001 | Kamei | ............ | 382/103 |
| 2002/0008758 A1* | 1/2002 | Broemmelsiek et al. | .... | 348/143 |
| 2002/0030741 A1* | 3/2002 | Broemmelsiek | ............ | 348/169 |
| 2003/0044045 A1* | 3/2003 | Schoepflin et al. | ......... | 382/103 |
| 2003/0169339 A1* | 9/2003 | Allen et al. | ................. | 348/169 |
| 2004/0010804 A1* | 1/2004 | Hendricks et al. | .......... | 725/110 |

FOREIGN PATENT DOCUMENTS

| JP | 2001103466 | 4/2001 |
|---|---|---|
| JP | 2001243476 | 9/2001 |
| JP | 2001285695 | 10/2001 |

* cited by examiner

*Primary Examiner*—Samir Ahmed
*Assistant Examiner*—ONeal R. Mistry
(74) *Attorney, Agent, or Firm*—Mattingly, Stranger, Malur & Brundidge, P.C.

(57) ABSTRACT

An object is detected in comparison between an input image from an image pick-up device having a zoom mechanism and a template image stored in a manner that a first image within a view field of the image pick-up device is stored as a first as the template image, a power of the zoom mechanism to be changed is recorded, a second image to be detected is picked-up from the image pick-up device. Then, a size of either one of the template image and the second image is changed on the bases of the changed power of the zoom mechanism, and a template matching is performed between the template image and the second image to detect the object. This process makes it possible to track an object within the view field.

23 Claims, 10 Drawing Sheets

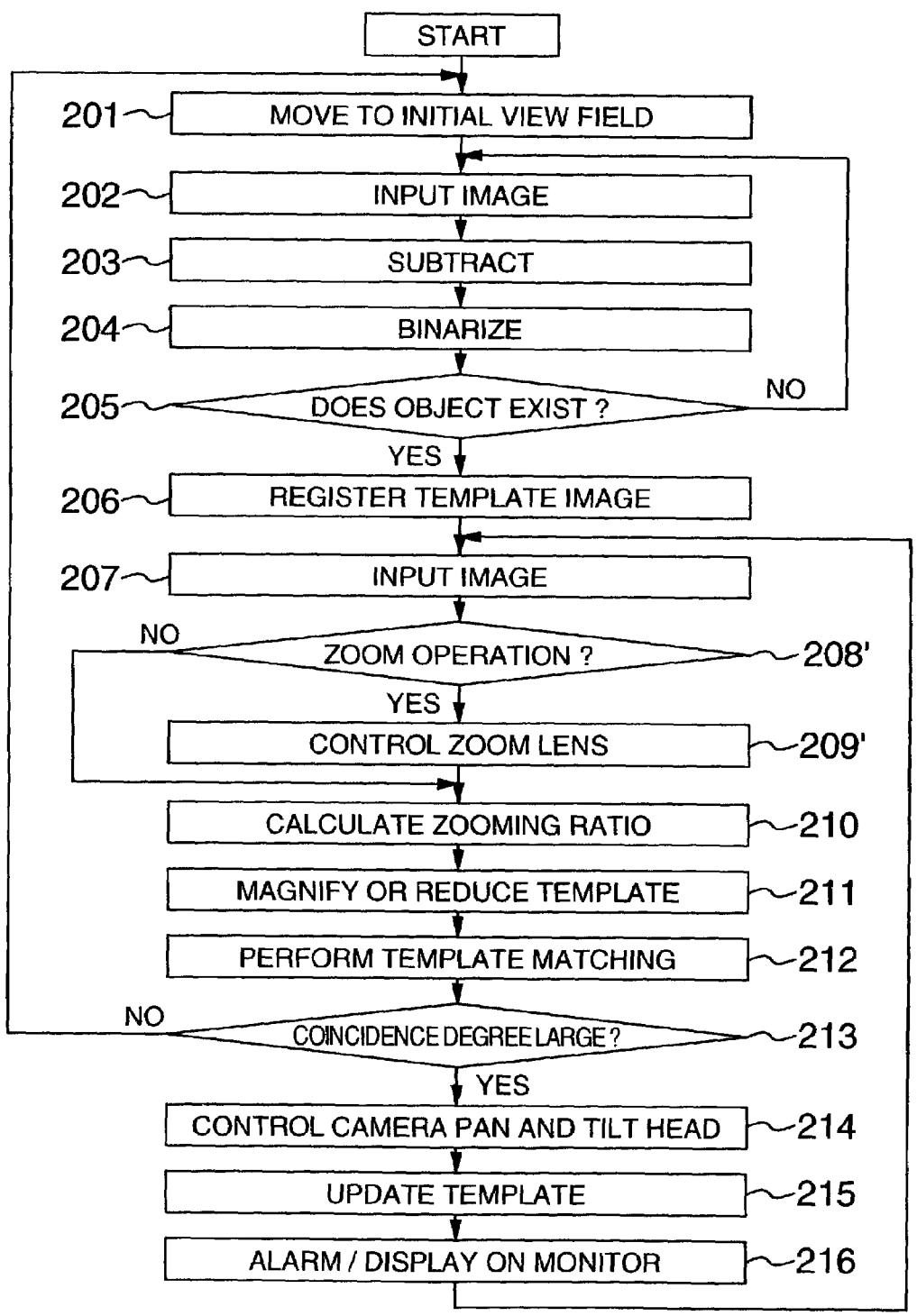

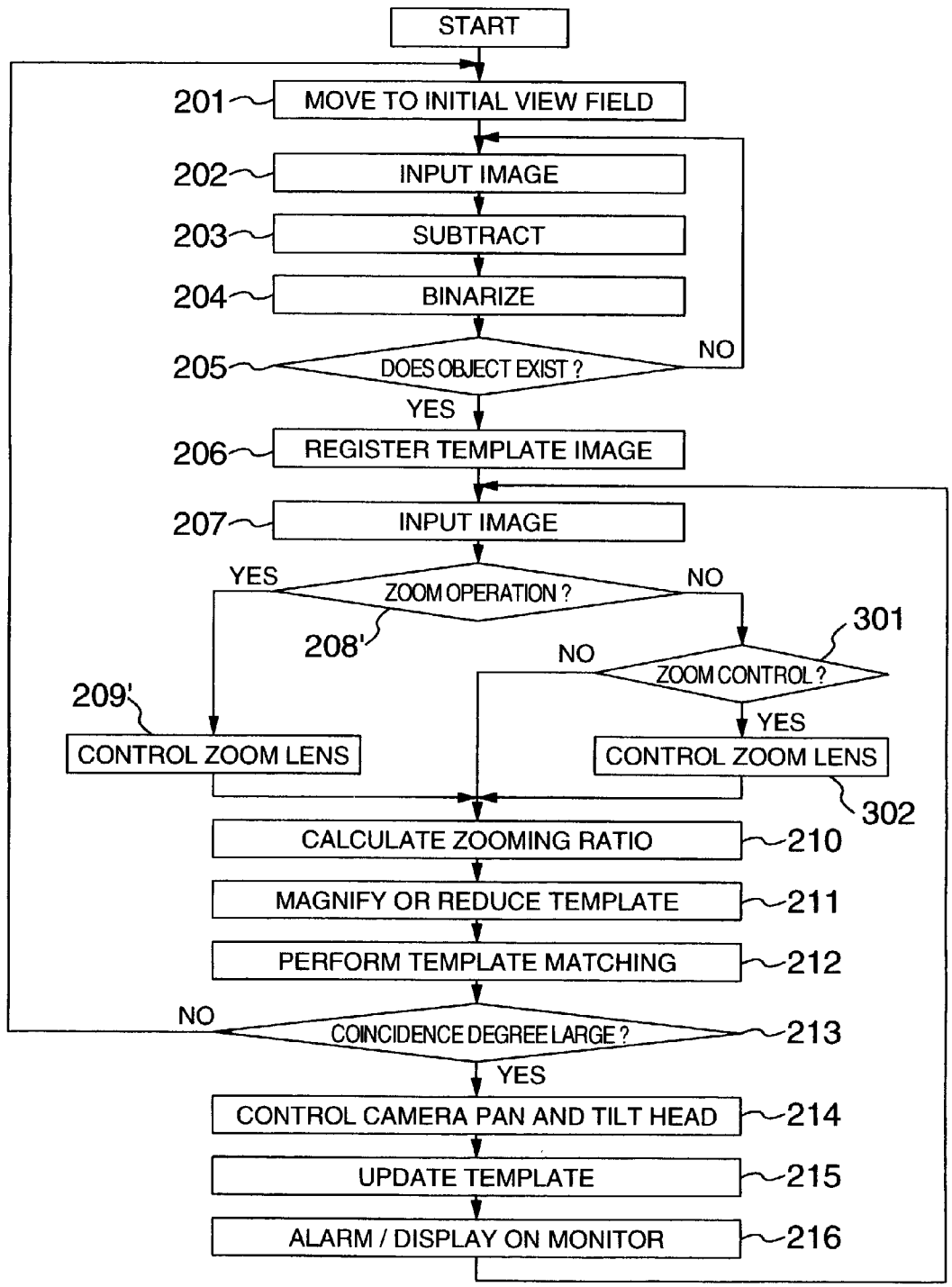

OBJECT TRACKING METHOD AND APPARATUS USING TEMPLATE MATCHING

CROSS-REFERENCE TO RELATED APPLICATION

The present invention is related to U.S. patent application Ser. No. 09/592,996 filed Jun. 13, 2000 entitled "OBJECT TRACKING METHOD AND OBJECT TRACKING APPARATUS"

BACKGROUND OF THE INVENTION

The present invention relates to a monitor apparatus using an image pickup unit, or in particular to an object tracking method for automatically detecting an object intruding into an imaging field or image pickup field from a video signal inputted from the image pickup unit and automatically tracking the motion of the detected object and an object tracking apparatus for automatically adjusting the imaging direction (central direction of an image) in accordance with the detected motion of the object.

A video monitor apparatus using an image pickup unit such as a television camera (referred to as a TV camera) has been widely used. As one of the monitor systems using such video monitor apparatuses, a manned monitoring system may be referred in which system an intruding object such as a man or an automotive vehicle entering the monitor field is detected or tracked by a human monitor while watching the image displayed on the monitor. However, apart from such a manned monitoring system, an automatic monitor system using a video monitor apparatus has been in demand, in which an intruding object is automatically detected from the image inputted from an image input unit such as a camera, the motion of the object is automatically tracked and a predetermined announcement or alarm action can be taken.

For realizing such an automatic monitor system, the first step is to detect an intruding object in the view field by a so-called subtraction method or the like. The subtraction method is executed to take the steps of comparing the input image obtained by an image pickup unit with a reference background image prepared in advance (i.e. an image not including the object to be detected), determine the brightness (or intensity) difference for each pixel, and detect an area with a large difference value as an object. The part of the input image (referred to as a partial image) corresponding to the position of the intruding object detected in this way is registered as a template, so that a position associated with the maximum degree of coincidence with the template image is detected in the sequentially inputted images. This method is widely known as the template matching, and is described in detail, for example, in the U.S. Pat. No. 6,208,033.

Ordinarily, in the case of tracking an object (for example, an object detected by the subtraction method) using the template matching, the partial image at the position of the object detected by the matching process is sequentially updated as a new template image because the template matching follows the change of the posture of the object. This process will be now described with reference to FIGS. 1 to 3.

FIG. 1 is a diagram useful for explaining the flow of the process of detecting an object intruded into the view field by the subtraction method and registering the detected object as an initial template image so that it may be used for the template matching.

In FIG. 1, numeral S01 designates an input image, numeral S02 a reference background image, numeral S03 a difference image between the input image S01 and the reference background image S02, numeral S04 a binarized image of the difference image S03, numeral S05 a subtraction processing unit, numeral S06 a binarization processing unit (Th), numeral S07 a man-like object in the input image S01, numeral S08 a man-like difference image in the difference image S03 corresponding to the man-like object S07, and numeral S09 a man-like object (man-like binarized image) in the binarized image S04 corresponding to the man-like difference image S08. Further, numeral S10 designates a circumscribed rectangle of the detected man-like object S09, numeral S11 an extraction processing unit (CL) of extracting a specified area from the input image S01, numeral S12 an extracted image constructed of the extracted area (template image), and numeral S13 a template image.

In FIG. 1, first, the input image S01 of e.g. 320×240 pixels is inputted from a camera E01 into an intruding object monitor apparatus E05. Then, in the subtraction processing unit S05, the brightness difference between the input image S01 and the reference background image S02 prepared in advance is calculated for each pixel thereby to acquire the difference image S03 in which the calculated difference of each pixel is assumed to be the brightness value thereof. At the same time, the man-like object S07 in the input image S01 appears in the difference image S03 as a man-like difference image S08.

Next, in the binarization processing unit S06, the brightness value of each pixel of the difference image S03 having the difference value less than a predetermined threshold (for example, 20) is set to "0", while the brightness value of each pixel not less than the threshold is set to "255" (assuming that one pixel includes 8 bits in this specification) thereby to obtain the binarized image S04.

In the process, the man-like object S07 picked up in the input image S01 is detected as a man-like object S09 in the binarized image S04 (Sketch of the object detecting process using the subtraction method).

In FIG. 1, furthermore, the circumscribed rectangle S10 of the man-like object S09 detected by the subtraction method is detected. Then, in the extraction processing unit S11, an area represented by the circumscribed rectangle S10 is extracted from the input image S01. The extracted image is registered as the template image S13 in the extracted image S12 (Sketch of the process of registering the initial template image).

FIGS. 2A and 2B are diagrams useful for explaining in an prior art the flow of the process of detecting where of the input image the intruding object registered in the template image using the template matching is located. In FIG. 2A, numeral M01 designates the extracted image obtained by the subtraction method (corresponding with the extracted image S12 in FIG. 1). In FIG. 2B, numeral M02 designates an input image obtained by the image pickup unit E01 and numeral M03 a template image.

Numeral M05 designates one of the dotted areas in the input image M02 and represents the position of the template image M03. Numeral M06 designates one of the dotted areas in the input image M02 and represents a search area of the template matching. Further, dx and dy represent the widths of the search area (in which dx represents the horizontal direction and dy the vertical direction). The widths dx and dy are set according to the amount of the apparent motion (the motion on the image) of the object to be tracked. For example, the widths dx and dy may be set as dx=50 pix and dy=15 pix.

The template matching is a process of searching the portion of the maximum degree of coincidence with the template image M03 in the search area M06 of the input image M02. As this coincidence may be used an index called the normalized correlation obtained from the following equation (1).

$$\gamma(x, y, u, v) = \frac{\sum_{i=0}^{W-1}\sum_{j=0}^{H-1} \{f(x+i, y+j) - \overline{f(x,y)}\}\{g(u+i, v+j) - \overline{g(u,v)}\}}{\sqrt{\sum_{i=0}^{W-1}\sum_{j=0}^{H-1} \{f(x+i, y+j) - \overline{f(x,y)}\}^2} \sqrt{\sum_{i=0}^{W-1}\sum_{i=0}^{H-1} \{g(u+i, v+j) - g(u+i, v+j) - \overline{g(u,v)}\}^2}} \quad (1)$$

In the equation (1), f( ) designates the input image, go the template image, (x, y) the coordinates in the search area M06 of the input image (called the matching area), and (u, v) the coordinates in the upper left (uppermost left portion) of the template image M03, in which in all figures the origin (0, 0) is located in the upper left (uppermost left) portion of the image. Further, W designates a width of the template image (horizontal length), and H a height of the template image (vertical length). Moreover, in the equation (1), $\overline{f()}$ and $\overline{g()}$ represent the average brightness value of the input image and the average brightness value of the template image, respectively, which are represented by the equations (2) and (3).

$$\overline{f(x, y)} = \frac{1}{WH}\sum_{i=0}^{W-1}\sum_{j=0}^{H-1} f(x+i, y+j) \quad (2)$$

$$\overline{g(u, v)} = \frac{1}{WH}\sum_{i=0}^{W-1}\sum_{j=0}^{H-1} g(u+i, v+j) \quad (3)$$

The normalized correlation r(x, y, u, v) represents the degree of coincidence between the brightness value distribution of the area with the width W and the height H, in which the position (x, y) of the input image f(x, y) is the upper left (uppermost left) coordinates (for example, M05 in FIG. 2B), and the brightness value distribution of the area with the width W and the height H, in which the position (u, v) of the template image g(u, v) is the upper left (uppermost left) coordinates (for example, M03 in FIG. 2A). In a case where the brightness value of each pixel of the input image f( ) is equal to that of the corresponding each pixel of the template image g( ), the normalized correlation is 1.0. The template matching is a process of detecting the portion of the maximum coincidence with the template image g( ) in the input image f( ).

That is, with the position (u, v) of the template image go as a reference position, as the position (x, y) is being changed in the range of u−dx≦x<u+dx, v−dy≦y<v+dy, the corresponding position (x, y) to the maximum normalized correlation r(x, y, u, v) represented by the equation (1) is searched.

Apart from the normalized correlation, as the degree of coincidence may be used the average absolute value of the difference of the brightness value of each corresponding pixel between the area with the width W and the height H in which the position (x, y) of the input image f( ) is the upper left (uppermost left) coordinates and the area with the width W and the height H in which the position (u, v) of the template image g( ) is the upper left coordinates.

In this instance, in a case where the brightness value of each pixel of the input image f( ) is equal to that of each corresponding pixel of the template image g( ) the average absolute value is made to be zero (0). As the difference of the brightness value of each corresponding pixel between the input image f( ) and the template image go is made larger, the average absolute value is made larger, (which means the degree of coincidence is made lower).

In the instance of FIG. 2B, the man-like object to be tracked is at the position of M04. The template matching process is executed to detect the area M07. Since this area M07 is detected at the position where the man-like object on the template image M03 coincides with the man-like object on the input image M02, the video monitor apparatus determines that the man-like object to be detected is inside the area M07. That is, it is understood that the intruding object is moving from the area M05 to the area M07. In this case, the movement of the intruding object may be represented by an arrow M08 connecting the center of the area M05 with the center of the area M07.

In turn, with reference to FIG. 3, the description will be oriented to the exemplary process of tracking an intruding object within a view field by applying the template matching described with reference to FIG. 2 into the sequentially inputted images. FIG. 3 is a diagram useful for explaining the process of tracking an object by sequentially performing the conventional template matching method.

In FIG. 3, numerals T01a, T02a, T03a and T04a designate extracted images at time points t0−1, t0, t0+1 and t0+2, respectively. Numerals T01c, T02c, T03c and T04c designate template images at time points t0−1, t0, t0+1 and t0+2, respectively. Numerals T01b, T02b, T03b and T04b designate input images at time points t0, t0+1, t0+2 and t0+3, respectively, numeral T05 a template matching processing unit (MT), T06 a template image updating unit (UD). In this figure, the time point t0+n means that the time is apart from the time point t0 by n frames, in which the processing time of one frame is 100 msec, for example.

The matching processing unit T05 compares the template image of the extracted image with the input image, detect the portion of the maximum degree of coincidence with the template image in the input image, and obtain the positions T01e, T02e, T03e and T04e of the intruding object to be tracked at time points t0, t0+1, t0+2 and t0+3 (template matching).

The template image update unit T05 specifies the image of the portion of the maximum degree of coincidence detected by the matching processing unit T04 as the position image of a new intruding object and replaces the extracted image and the template image using the position image, thereby updating the template image.

Then, the description will be oriented to the template matching process and the template image updating process along time points t0−1, t0, t0+1, t0+2 and t0+3 with reference to FIG. 3.

First, the template matching process is executed by using the template image T01c obtained at time point t0−1 and the input image T01b obtained at time point t0. In the first processing frame, the template image T01c is matched to the partial image S13 of the input image S01 corresponding to the position of the circumscribed rectangle of the man-like object S09 detected by the subtraction method.

The template matching processing unit T05 detects the position image T01e of the intruding object T01d by the template matching described with reference to FIGS. 2A and 2B.

The template image update unit T06 updates the extracted image from T01a to T02a by using the input image T01b having a new position image (template) T01e as the extracted image and also updates the template image from T01c to T02c on the basis of the position image T01e of the intruding object. By executing this kind of process at time points t0, t0+1, t0+2 and t0+3 respectively, it is understood that the intruding object within a view field is moved in the sequence indicated in the position images T01e, T02e, T03e and T04e.

SUMMARY OF THE INVENTION

The template matching is a process of detecting a portion of the maximum degree of coincidence with the template image in the input image. Thus, it is necessary to make the intruding object on the template image substantially equal to the intruding object to be detected in the input image. Hence, the change of a zooming ratio (zooming power) of the image pickup unit makes the intruding object displayed on the template image different in size from the intruding object to be detected in the input image, which brings about a disadvantage that no precise positioning of the intruding object can be performed.

Further, whether or not the intruding object is detected is determined on whether or not the maximum degree of coincide obtained by the template matching is not less than a predetermined value. The predetermined value is 0.5, for example, in the case of using the normalized correlation.

The change of a zooming ratio of the image pickup unit makes the intruding object displayed on the template image different in size from the intruding object to be detected on the input image, thereby causing the degree of coincidence to be lower. As a disadvantage, therefore, if the degree of coincidence is not more than the predetermined value, the disability to detect the intruding object is determined.

As described above, if the zooming ratio (zooming power) of the zoom lens undergoes a change, as a disadvantage, the object tracing method using the foregoing template matching of the prior art provides no capability of precisely detecting the position of the intruding object and further detecting the intruding object itself.

It is an object of the present invention to provide an object tracing method and apparatus which are arranged to obviate the foregoing disadvantages of the prior art.

It is another object of the present invention to provide an object tracking method and apparatus which are arranged to precisely detect and track an object with high reliability.

In carrying out the foregoing objects, according to an aspect of the invention, an object detecting method for detecting an object in comparison between an input image from an image pick-up device having a zoom mechanism and a template image stored including the steps of:

storing a first image within a view field of the image pick-up device as the template image;

recording a power of the zoom mechanism to be changed;

picking-up a second image to be detected from the image pick-up device;

changing a size of either one of the template image and the second image on the bases of the changed power of the zoom mechanism; and performing a template matching between the template image and the second image to detect the object.

The prior art using the template matching has a disadvantage that the adjust of the zoom lens may make the target intruding object different in size from the template image and the precise matching therebetween cannot be guaranteed, thereby being unable to track the object with reliability.

However, as described above, according to the present invention, the zooming ratio is calculated with reference to the ratio of a focal distance (focal length) at the time of obtaining the template image to a focal distance at the time of obtaining the input image and thereby the template image is magnified according to the zooming ratio. This allows a target intruding object to be precisely tracked as controlling or operating the zoom lens.

The present invention, therefore, provides a capability of eliminating the conventional restriction of the zoom lens control of the image pickup unit, reliably tracking the intruding object, and greatly spreading the application range of the video monitor apparatus.

Other objects, features and advantages of the invention will become apparent from the following description of the embodiments of the invention taken in conjunction with the accompanying drawings.

BRIEF DESCRIPTION OF THE DRAWINGS

FIG. 10 is a flowchart illustrating an object tracking process according to a second embodiment of the present invention; and FIG. 11 is a flowchart illustrating an object tracking process according to a third embodiment of the present invention.

DETAILED DESCRIPTION OF THE EMBODIMENTS

In order to obviate the disadvantages that the intruding object cannot be precisely detected and that the degree of coincidence between the template image and the input image becomes lower if the intruding object displayed on the conventional template image is different in scale (size) from the intruding object to be detected on the input image, the object tracking method according to the present invention is arranged to perform the template matching so that the intruding object displayed on the template image is made to be equal in scale (size) to the intruding object on the input image by magnifying or reducing the template image on the basis of the change of a focal distance (focal length) of a zoom lens.

That is, the object tracking method according to the invention is arranged to calculate a magnifying or reducing a power of the template image with reference to a ratio of a focal distance of the zoom lens of the image pickup unit at a time of obtaining the input image from which the registered template image was extracted to a focal distance of the zoom lens of the image pickup unit at a time of obtaining the input image that is subjected to the template matching and to track an object within the range of a view field of the image pickup unit by performing the template matching processing as magnifying or reducing the template image. This arrangement allows the object to be tracked as changing the zoom ratio of the zoom lens of the image pickup unit.

Figure 6:
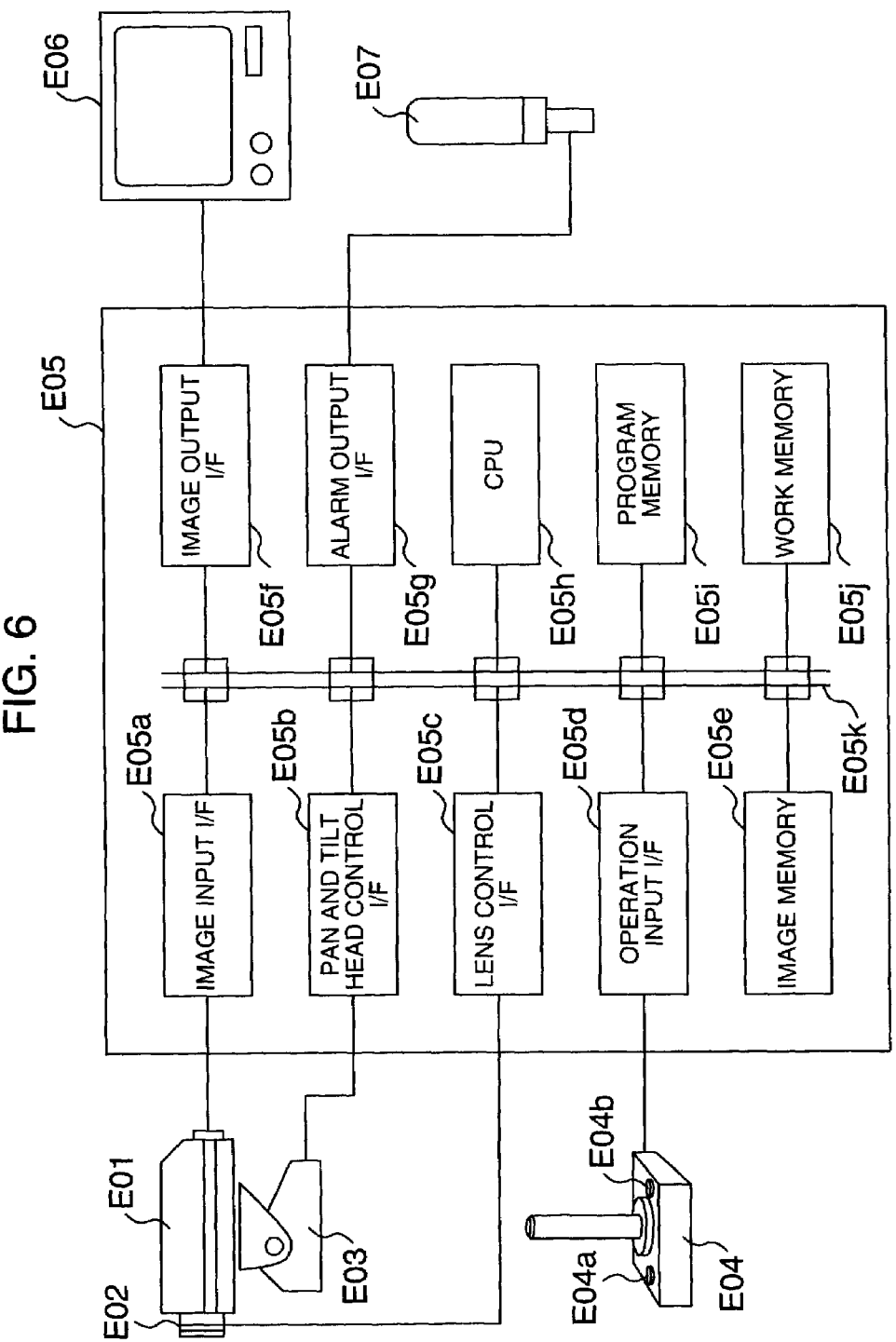
FIG. 6 is a block diagram showing an arrangement of an object tracking apparatus according to an embodiment of the present invention.

The arrangement of the video monitor apparatus according to an embodiment of the present invention will be described with reference to FIG. 6. FIG. 6 is a block diagram showing an arrangement of the object tracking apparatus according to an embodiment of the present invention. Numeral E01 designates an image pickup unit (for example, TV camera), numeral E02 a zoom lens, numeral E03 an electric swivel (for example, a camera pan and tilt head), numeral E04 an operation unit, numeral E04a a first button annexed with the operation unit E04, numeral E04b a second button annexed with the operation unit E04. In the monitor apparatus (image processing unit) E05, numeral E05a designates an image input I/F (I/F: Interface), numeral E05b a pan and tilt head control I/F, numeral E05c a lens control I/F, numeral 05d an operation input I/F, numeral E05e an image memory, numeral E05f an image output I/F, numeral E05g an alarm output I/F, numeral E05h a CPU (Central Processing Unit), numeral E05i a program memory, numeral E05j a work memory, numeral E05k a data bus, numeral E06 an output monitor, numeral E07 an alarm lamp, and numeral E05 an intruding object monitor apparatus arranged to have the image input I/F E05a, the tilt and pan head control I/F E05b, the lens control I/F E05c, the operation input I/F E05d, the image memory E05e, the image output I/F E05f, the alarm output I/F E05g, the CPU E05h, the program memory E05I, the work memory E05j and the data bus E05k. In addition, the image memory and the work memory may be composed of a single memory.

In FIG. 6, the TV camera E01 is connected to the image input I/F E05a, the zoom lens E02 is connected to the lens control I/F E05c, the camera pan and tilt head E03 is connected to the pan and tilt head control I/F E05b, the operation unit E04 is connected to the operation input I/F E05d, the output monitor E06 is connected to the image output I/F E05f, and the alarm lamp E07 is connected to the alarm output I/F E05g. Further, the image input I/F E05a, the pan and tilt head control I/F E05b, the lens control I/F E05c, the input I/F E05d, the image memory E05e, the image output I/F E05f, the alarm output I/F E05g, the CPU E05h, the program memory E05I and the work memory E05j are all connected to the data bus E05k.

In FIG. 6, the TV camera E01 is mounted on the camera tilt and pan head E03 and provides the zoom lens E02. The TV camera E01 picks up an image of an object monitored (within the range of a monitor field), converts the picked-up signal into a video signal, and then output the video signal into the image input I/F E05a of the object tracking apparatus E05.

The image input I/F E05a converts the picked-up video signal into the image data of a type to be processed by the object tracking apparatus E05 and outputs the converted image data into the image memory E05e through the data bus E05k. The image memory E05e accumulates the images being inputted.

The CPU E05h reads out the images accumulated in the image memory E05e in accordance with the program saved in the program memory E05i in advance and then analyzes the read images in the work memory E05j. The CPU E05h controls the zoom lens E02 through the lens control I/F E05c from the data bus E05k along the analyzed result or control the camera tilt and pan head E03 through the tilt and pan control I/F E05b so as to change the view field of the TV camera E01, turn on the alarm lamp E07 through the alarm output I/F E05g, and display the image with an intruding object detected, for example, on the monitor E06 through the image output I/F E05f.

The image memory E05e provides a template image holding unit for saving the registered template images.

The following embodiment includes the hardware arrangement of the object tracking apparatus described with reference to FIG. 6.

Figure 5:
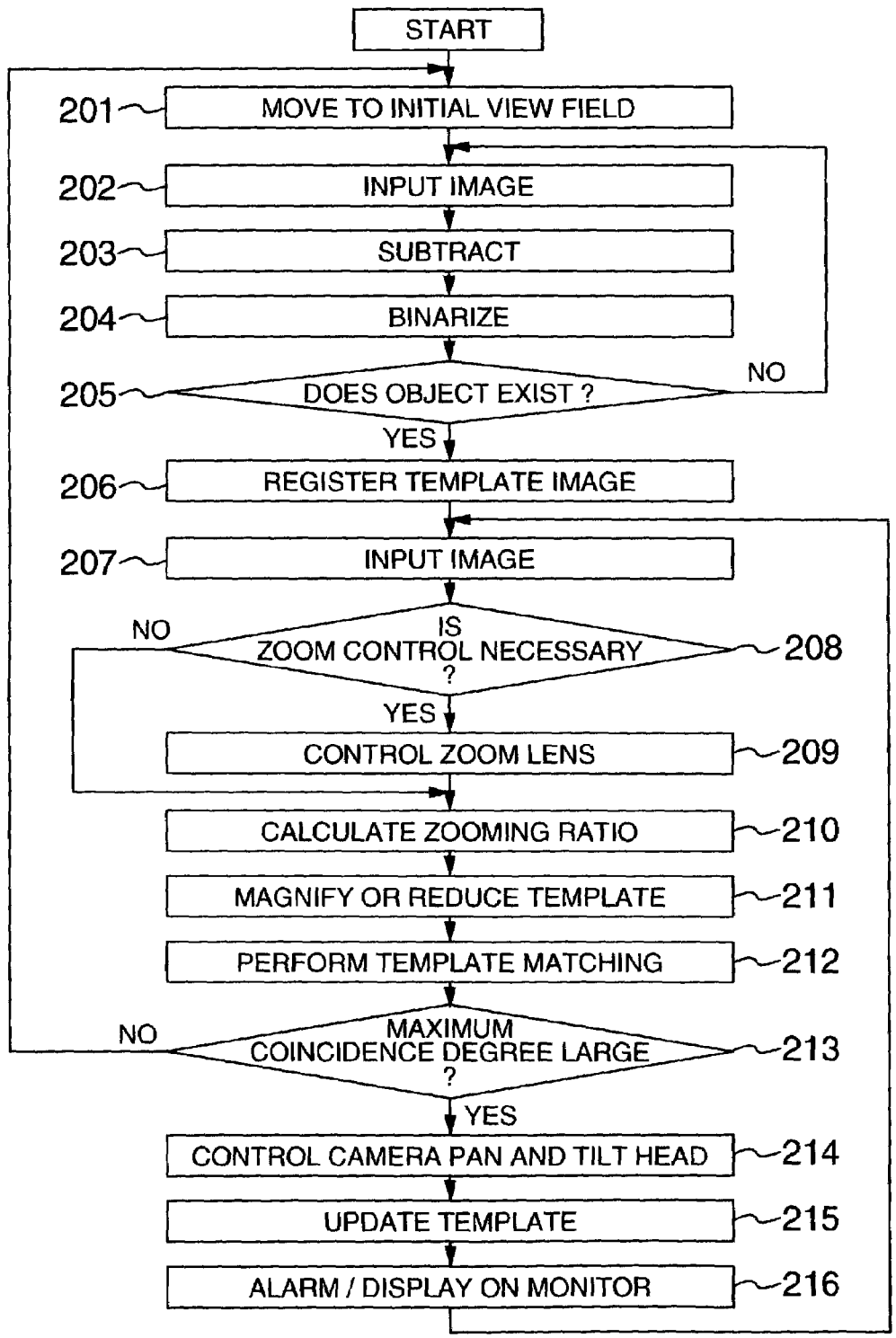
FIG. 5 is a flowchart illustrating the process according to an embodiment of the present invention.

One embodiment of the invention will be described with reference to FIG. 5. FIG. 5 is a flowchart illustrating the process of the embodiment.

First, in step 201 of an initial view field movement, the zoom lens E02 and the camera tilt and pan head E05 are moved to a predetermined initial position so that the TV camera E01 may pick up an initial view field range (initial monitor field range). The initial view field is a view field within which displayed is a doorway of a specific building to be specifically monitored, for example.

Figure 1:
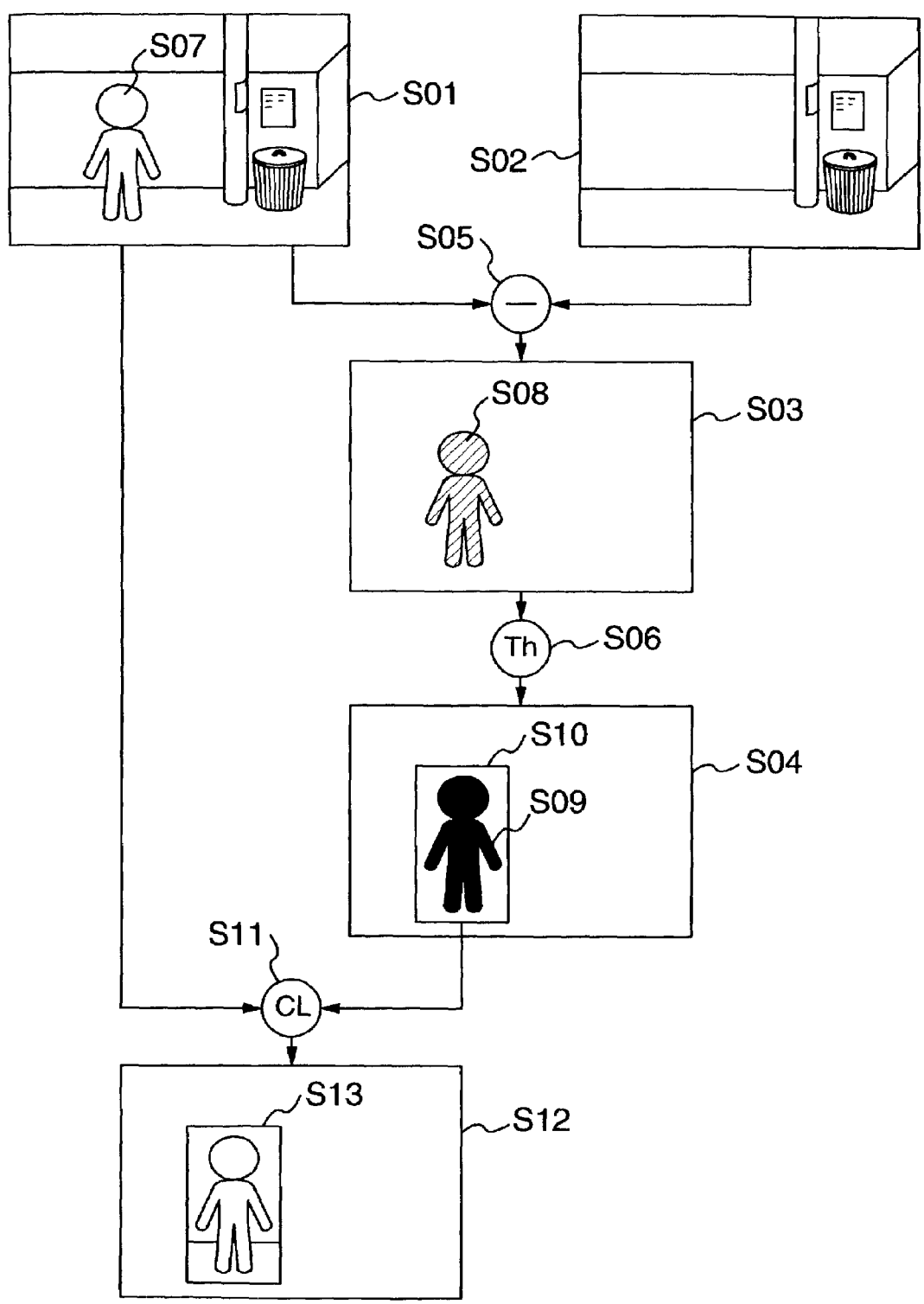
FIG. 1 is a diagram useful for explaining the process of detecting an object using the conventional subtraction method.

The following steps 202 to 206 represent the process from detection of an intruding object to registration of a template image using the subtraction method described with reference to FIG. 1. Hereafter, the process will be described with reference to FIG. 1.

First, in the step 202 of inputting an image, the input image S01 of 8 bit/pix with a width of 320 pix and a height of 240 pix is obtained from the camera E01.

In the step 203 of subtraction, the operation is executed to calculate a difference of a brightness value of each pixel between the input image S01 obtained at the step 202 of inputting an image and the reference background image S02 recorded in the image memory E05e in advance and then obtain the difference image S03 with the difference value as the brightness value of the corresponding pixel.

Then, in the binarizing step 204, the operation is executed to compare each pixel value of the difference image S03 obtained in the subtraction step 203 with a threshold value and then obtain the pixel value of "0" if the pixel value is less than the threshold value (e.g., 20) or the pixel value of "255" if it is not less than the threshold value.

Next, in the object determining step 205, the operation is executed to detect a cluster S09 of the pixels each having a pixel value of "255" by using the known labeling method and then to determine if an object exists in the cluster of pixels. If yes, the process is branched into the template image registration step 206, while if no, the process is branched into the image input step 202, in which the next latest (present picked-up) input image is obtained, and then the process of the steps 203 to 205 is executed.

In the template image registration step 206, the operation is executed to calculate the circumscribed rectangle S10 of the binarized object S09 detected in the process of the image input step 202 to the object determining step 205, cut the corresponding area to the circumscribed rectangle S10 from the input image S01, and then register the area as the initial template image S13 in the image memory E05e.

The steps 207 to 216 correspond to the process of tracking the intruding object S07 detected by the subtraction method through the use of the template matching.

Like the image input step 202, in the image input step 207, the latest (present picked-up) input image (M02) of 8 bit/pix with a width of 320 pix and a height of 240 pix, for example, is obtained from the TV camera E01.

Then, in the zoom control determining step 208, in a case where the size of the template image of the intruding object being tracked is not fitted within the predetermined range, the zoom lens control is required. Hence, the operation is branched into the zoom lens control step 209. On the other hand, if it is fitted within the predetermined range, the operation is branched into the zooming ratio calculating step.

Herein, the predetermined range means such a range within which the entirety of the intruding object is contained within the view field of the image pick-up device. For example, the apparent height (length in the vertical (y) direction: for example, H in FIG. 2B) of the intruding object is adjusted to be fitted within the range of ⅓ to ½ of the total height (for example, H0 in FIG. 2B) of the input image. This is performed by using such a feature that an intruding object is seen to be elongated in the vertical direction and hence the entire image of the intruding object can be captured within the image from the TV camera E01 so long as the entire image along the vertical direction of the intruding object is extracted and displayed within the screen. In this case, therefore, the apparent height of the intruding object is adjusted to be within the range of 80 to 120 pix.

In addition, the predetermined range is not limited to the foregoing range. What is required is simply to adjust the distance from the position of the intruding object into the vertical and horizontal edges of the input screen to be not less than the apparent moving distance of the intruding object per one frame of the input screen. This is because, since the template matching is a process of detecting an image of an intruding object from an input image, if the intruding object moves out of the screen (that is, the input image) in the next processing frame after updating a template, the detection of the intruding object using the template matching can not be performed. For example, therefore, if the intruding object is moved only in the horizontal direction, it is just necessary to fit the apparent height of the intruding object into the range of the total height of the input image.

Next, in the zoom lens control step 209, in order to suitably adjust the size of the intruding object in the input image, if the size of the template image is less than the predetermined range, the operation is executed to zoom in the zoom lens E02 (make the focal distance longer) through the lens control I/F E05c. On the other hand, if the size of the template image is more than the predetermined range, the process is executed to zoom out the zoom lens E02 (make the focal distance shorter) through the lens control I/F E05c.

This operation makes it possible to control the zoom lens E02 so that the apparent size of the intruding object may be fitted within the predetermined range, that is, it may be the foregoing set value. This type of zoom lens control is realized by performing the feedback control of the zoom lens E02 so as to be the set value on the basis of the apparent size of the intruding object.

Then, in the zooming ratio calculating step 210, the process is executed to calculate a ratio of a focal distance ft of the zoom lens at a time of obtaining the extracted image M01 of the registered template image M03 (at a time of inputting the template image registered in the step 206, that is, at a time of inputting the template image or at a time of inputting the template image updated in the step 215 to be discussed below, that is, at a time of inputting an image in the step 207) to a focal distance fi of the zoom lens at a time of obtaining the input image M02 and then calculate a zooming ratio (zooming power) based on the ratio. Herein, one processing frame designates the intruding object tracking process by using the template matching based on the input image from the step 207 to the step 212.

The zooming ratio is 15/12=1.25 if ft=12 mm and fi=15 mm, for example.

Further, in the template magnification and reduction step 211, the operation is executed to magnify (in which case the zooming ratio is more than 1.0) or reduce (in which case the zooming ratio is less than 1.0) the template image based on the zooming ratio obtained in the zooming ratio calculating step 210. In this process, for example, in a case where the size of the template image before magnification or reduction is horizontally 30 and vertically 50 and the zooming ratio is 1.25, the size of the magnified or reduced template image is made to be horizontally 30×1.25=38 pix and vertically 50×1.25=63 pix (both of which are rounded off).

Instead of magnifying or reducing the template image, the input image may be magnified or reduced. In this case, the zooming ratio becomes a reciprocal number of the aforesaid zooming ratio, that is, ft/fi. In the method of magnifying or reducing the template image, when the zooming ratio becomes smaller than 1.0, the number of the pixels constituting the template image becomes small, so that the reliability of the template matching may be degraded. In this case, such a problem does not arise if the input image is magnified instead of reducing the size of the template. Although the magnifying or reducing processing of the template image or the input image is performed electronically (on the pixel unit basis), the magnifying or reducing processing of the image may be performed by a zooming mechanism. For example, the magnifying or reducing processing of the image may be performed optically by controlling a zoom lens based on the calculated zoom ratio.

Figure 2B:
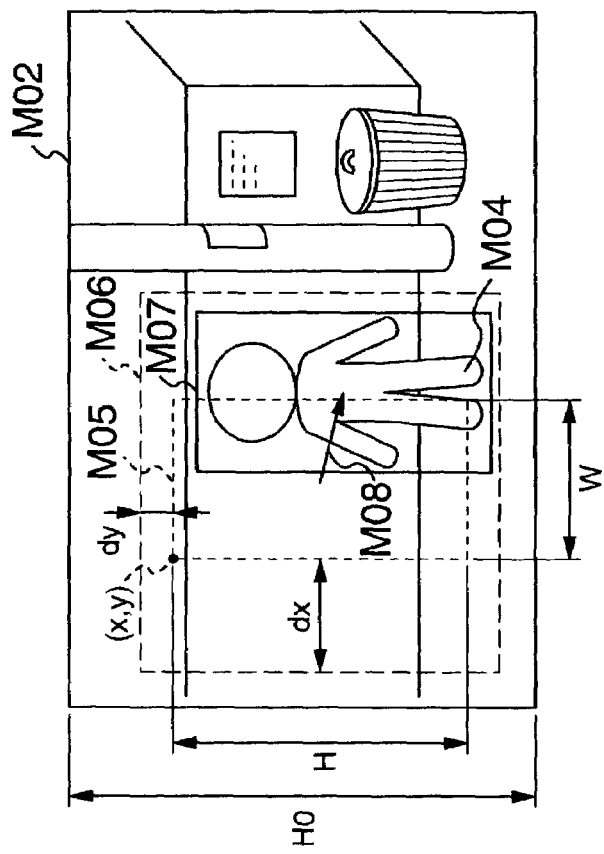
FIGS. 2A and 2B are diagrams useful for explaining the process of detecting an object using the conventional template matching method.
Figure 2A:
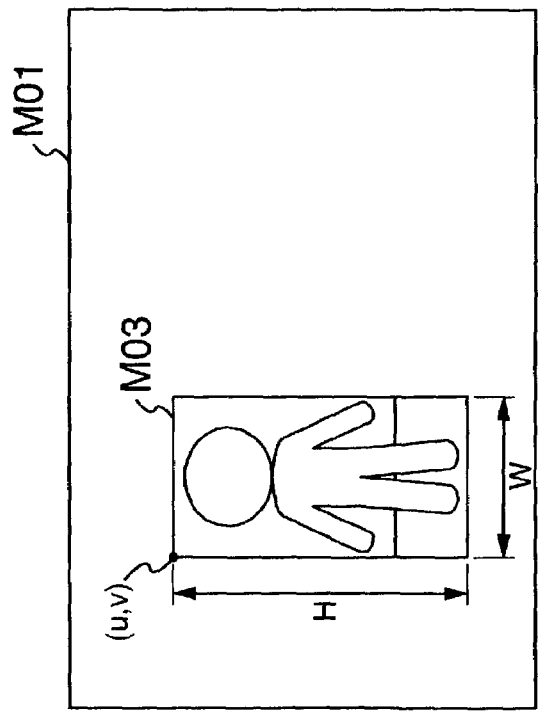

In the template matching step 212, the process is executed to search the partial image with the maximum degree of coincidence with the template image in the input image and detect where the intruding object is located by using the template matching described with reference to FIGS. 2A and 2B.

Then, in the coincidence determining step 213, the process is executed to determine if the maximum degree of coincidence obtained by the template matching in the step 212 is not less than the predetermined value (for example, 0.5 if the normalized correlation is applied to the template matching). If the maximum degree of coincidence is less than the predetermined value, it is determined that no intruding object is detected (no corresponding partial image to the template image is found in the input image). Hence, the process is branched into the initial view field moving step 201 from which the process of the steps 201 to 212 is repeated. Further, if the maximum degree of coincidence is not less than a predetermined value, it is determined that any intruding object is detected. Hence, the process is branched into the camera tilt and pan head control step 214.

In the camera tilt and pan head control step 214, the camera tilt and pan head E03 is controlled on the basis of the position of the detected intruding object. This control is executed to pan the camera tilt and pan head E03 to the right hand if the intruding object (the center of the partial image detected in the input image) is located in the right hand from the center of the image, pan it in the left hand if it is located in the left hand from the center of the image, tilt upward if it is located upward from the center of the image, or tilt downward if it is located downward from the center of the image.

In the pan and tilt head control step 214, the pan and tilt motor of the camera pan and tilt head E03 is controlled based on the displacement between the image center and the position of the target object (intruding object) detected by template matching, i.e. the direction of the target object with respect to the optical axis of the camera. Specifically, the center position of the target object detected by template matching is compared with the center position of the image, and in the case where the center position of the target object detected is located to the left of the center position of the image, the pan motor of the camera pan and tilt head is controlled to move the optical axis of the camera leftward, while in the case where the center position of the target objected is located to the right of the center position of the image, on the other hand, the pan motor of the camera pan and tilt head is controlled to move the optical axis of the camera rightward. Also, in the case where the center position of the target object detected is located above the center position of the image, the tilt motor of the camera pan and tilt head is controlled to move the optical axis of the camera upward, while in the case where the center position of the target object detected is located below the center position of the image, the tilt motor of the camera pan and tilt head is controlled to move the optical axis of the camera downward. The pan motor and the tilt motor can be controlled at the same time. In the case where the center position of the target object detected is located to the left above the center position of the image, for example, the tilt motor of the camera pan and tilt head is controlled to move the optical axis of the camera leftward while at the same time controlling the pan motor to move the optical axis of the camera upward. By doing so, the camera pan and tilt head can be controlled in such a manner as to hold the target object on the optical axis of the camera.

Figure 3:
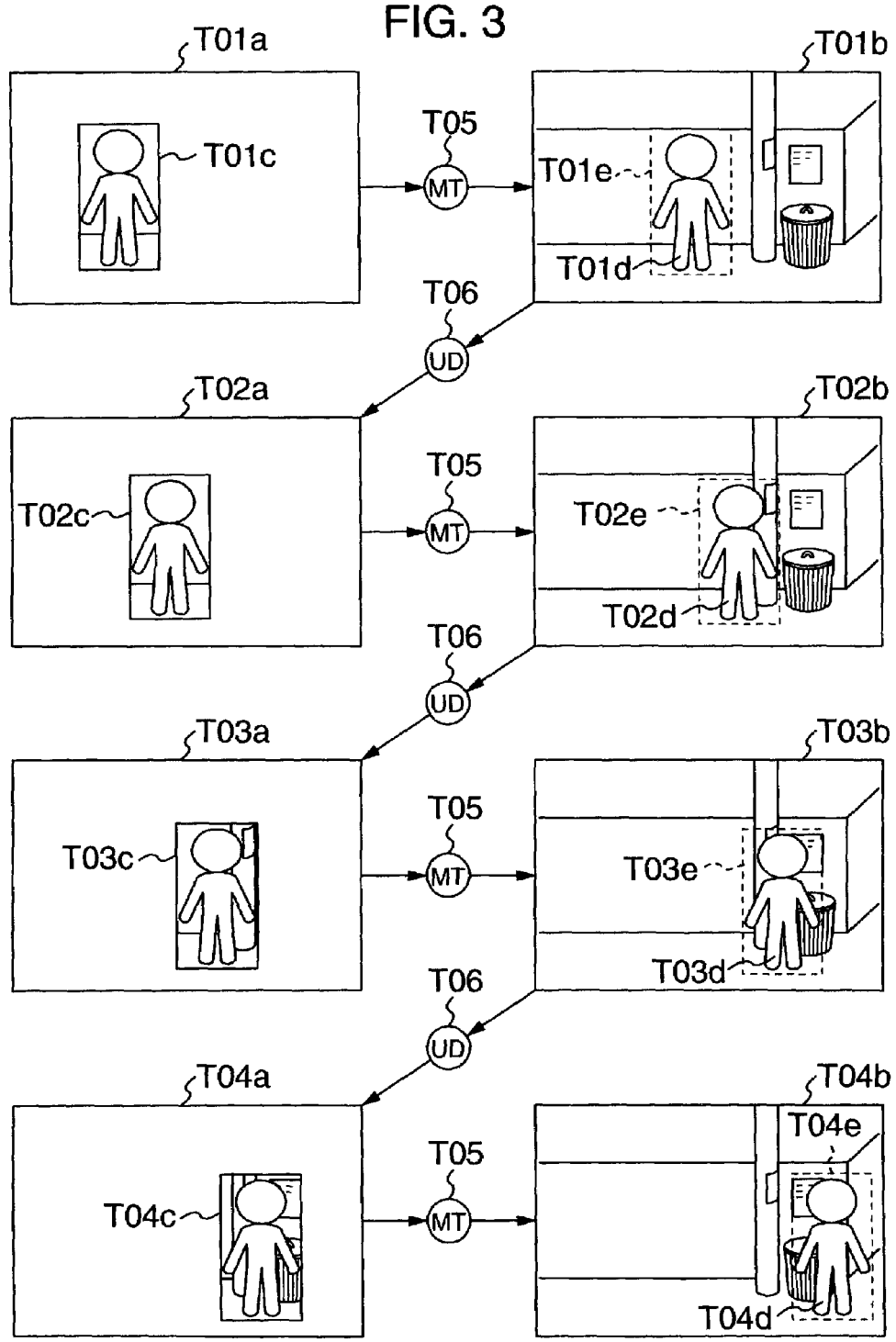
FIG. 3 is a diagram useful for explaining the process of tracking an object by sequentially performing the conventional template matching method.

Further, in template updating step 215, the process is executed to perform the similar process to the template image update unit T06 described with reference to FIG. 3. That is, the operation is executed to cut the corresponding area to the partial image M07 with the maximum degree of coincidence with the template image from the input image M02 and then update the template image with the cut area as a new template image M03.

In alarming and monitoring step 216, the process is executed to display an image of a target object on the monitor E06 or light the alarm lamp E07 through the alarm output I/F E05g, for reporting the existence of an intruding object.

Figure 4:
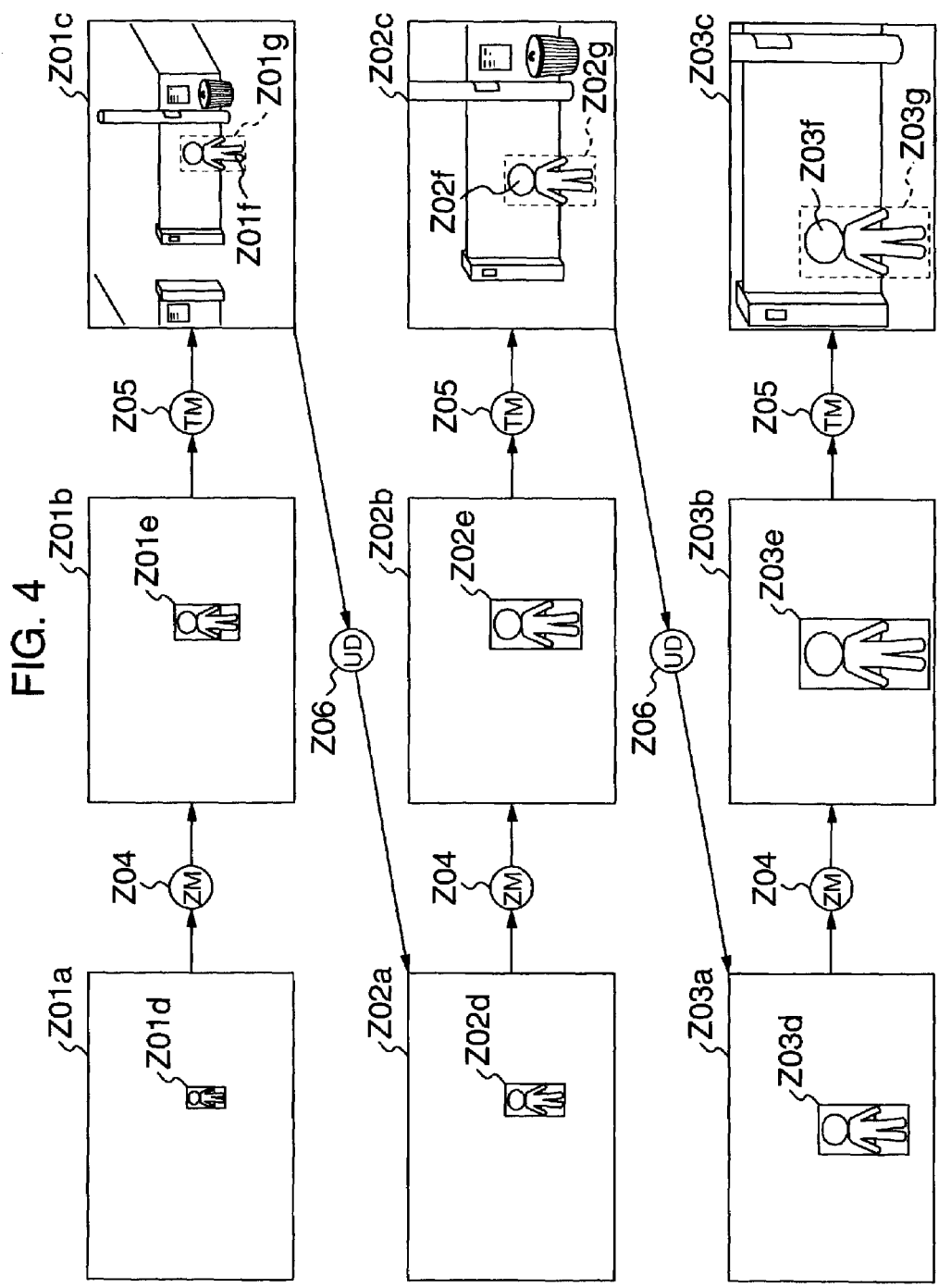
FIG. 4 is a diagram useful for explaining the operation of the process of tracking an object according to an embodiment of the present invention.

In turn, the description will be oriented to the process of performing the template matching as magnifying or reducing the template image by repeating the process of the steps 207 to 216 for tracking an intruding object with reference to FIG. 4. FIG. 4 is a diagram useful for explaining the process of tracking an object according to an embodiment of the present invention. As shown in FIG. 4, first, the process is executed to track an intruding object within the range of a view field of the image pickup unit by using the extracted image $Z01a$ based on the input image obtained at time point $T1-1$ and the template image $Z01d$.

Each of the images $Z01a$, $Z02a$ and $Z03a$ is the extracted image obtained on the input image at time point $T1-1$, $T1$ or $T1+1$. Further, each of the images $Z01d$, $Z02d$ and $Z03d$ is the template image obtained on the input image at time point $T1-1$, $T1$ or $T1+1$. Each of the images $Z01c$, $Z02c$ and $Z03c$ is the input image at time point $T1$, $T1+1$ or $T1+2$.

The template image $Z01d$ based on the input image obtained at time point $T1-1$ is processed as follows in a magnification and reduction unit (ZM) Z04 (steps 210 and 211). That is, the process is executed to calculate a zooming ratio with reference to a ratio of a focal distance of a zoom lens at a time of obtaining the original input image of the extracted image $Z01a$ from the TV camera to a focal distance of the zoom lens at a time of obtaining the input image $Z01c$ from the TV camera (step 210), magnify or reduce the template image $Z01d$ using the calculated zooming ratio, and then obtain the magnified or reduced extracted image $Z01b$ and the template image $Z01e$.

Herein, the process of increasing the focal distance of the zoom lens will be described with reference to FIGS. 8 and 9.

Figure 8:
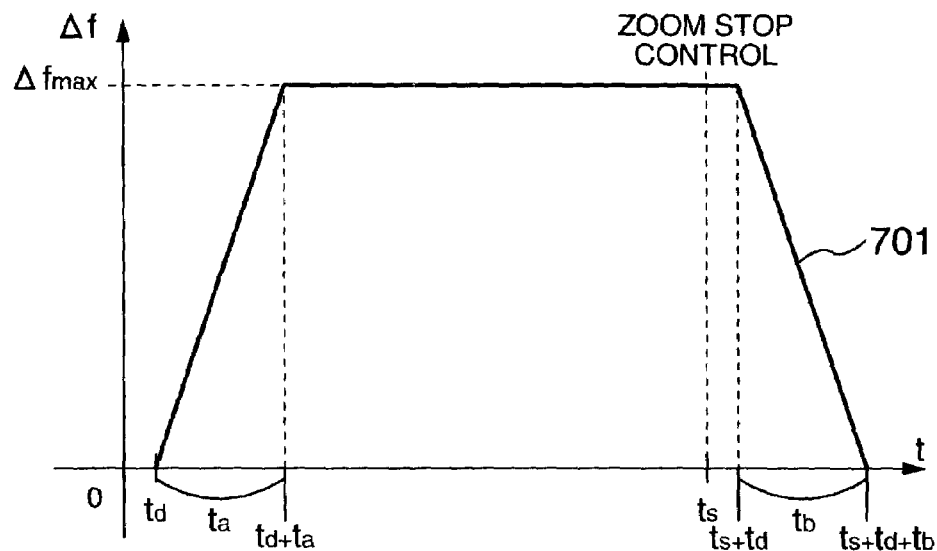
FIG. 8 is a graph showing an exemplary operation in the case of increasing a focal distance of a zoom lens in the embodiment of the present invention.

FIG. 8 is a graph showing the increase of the focal distance of the zoom lens when zooming in the lens as a result of executing the present invention. FIG. 8 represents the increase of the focal distance of the zoom lens against the zoom lens control time t in controlling the zoom-in operation.

Figure 9:
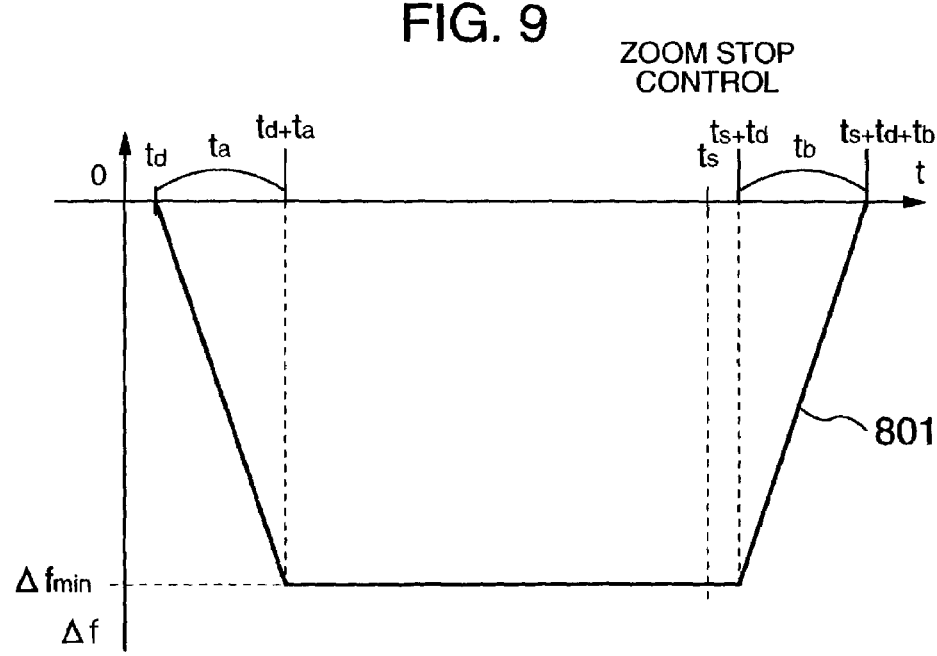
FIG. 9 is a graph showing an exemplary operation in the case of increasing a focal distance of a zoom lens in the embodiment of the present invention.

FIG. 9 is a view showing the increase of the focal distance of the zoom lens when zooming in the lens as a result of executing the present invention. FIG. 9 represents the decrease of the focal distance of the zoom lens against the zoom lens control time t when controlling the zoom-out time.

In FIG. 8, the zoom-in control is started at time point $t=0$, for example.

In this case, if it is assumed that a delay of time td (0.1 sec, for example) takes place until the zoom lens is started. Then, the zoom lens is accelerated for a time ta (0.5 sec, for example), the focal distance is incremented by $\Delta fmax$ and the zoom lens is stopped at time point ts, a delay of time td (0.1 sec, for example) takes place and then the zoom lens is decelerated for a time tb (0.5 sec, for example). This is the accelerating and decelerating characteristic 701 in this case. Herein, the actual increase of the focal distance corresponds to a trapezoid area of the accelerating and decelerating characteristic 701. The zoom-in operation for a time of ts seconds allows the focal distance to be increased by $(2ts-ta+tb)\times\Delta fmax/2$ (when $ts \geq ta$), $(ta+tb)\times ts^2/ta^2 \times \Delta fmax/2$ (when $ts<ta$).

Assuming that the focal distance before the zoom-in operation is 10.0 mm, the zoom-in operation of $\Delta fmax=2.0$ mm/sec and $t=0.5$ sec causes the focal distance to be up to 20.0 mm and the zooming ratio of the input image before and after the zoom-in operation is 20.0/10.0=2.0. Like the zoom-out control in FIG. 8, the zoom-out operation for a time of ts sec causes the focal distance to be decreased by $(2ts-ta+tb) \times \Delta fmax/2$ (when $ts \geq ta$), $(ta+tb) \times ts^2/ta^2 \times \Delta fmax/2$ (when $ts<ta$).

In the magnification and reduction unit Z04, the extracted image Z01b and the template image Z01e are magnified or reduced according to this zooming ratio.

Then, in the template matching unit (TM) Z05 (step 212), by performing the template matching for the input image Z01c using the magnified or reduced template image Z01e, it is possible to obtain the partial image Z01g of the input image Z01c as an image of coincidence. Hence, it is determined that the intruding object in the input image Z01c exists in Z01f.

The magnification and reduction unit Z04, the template matching unit Z05 and the template image update unit Z06 are programs for performing the magnification and reduction, the template matching and the template image update, all of which are saved in a program memory E05i in advance.

Next, in the template image update unit Z06 (step 215), the extracted image and the template image are updated on the detected partial image Z01g of the input image Z01c. That is, the new extracted image Z02a and the new template image Z02d are obtained.

Afterwards, the obtained partial image Z01g is made to be the new template image Z02d. This new template image is subjected to the magnification and reduction processing. Then, the magnified and reduced template image Z02e and the new input image at time point t1+1 are used for the template matching. Then, the new extracted image Z023a and template image Z03d are obtained on the detected partial image Z02g of the input image Z02c.

The sequential execution of the similar process causes the intruding object Z02f to be obtained at time point t1+1 and the intruding object Z03f to be obtained at time point T1+2 as controlling the zoom lens E02. This process makes it possible to track the intruding object in the input image.

As noted above, according to the embodiment of the invention, in the zoom control determining step 208 and in the zoom lens control step 209, the zoom lens is controlled on the size of the intruding object. The zooming ratio is calculated in the zooming ratio calculating step 210 and the template image is magnified or reduced on the basis of the zooming ratio in the template magnification and reduction step 210. Hence, this embodiment makes it possible to accurately track the intruding object without deviating the template image from the target intruding object as operating the zoom lens and without lowering the degree of coincidence in the template matching.

Figure 7:
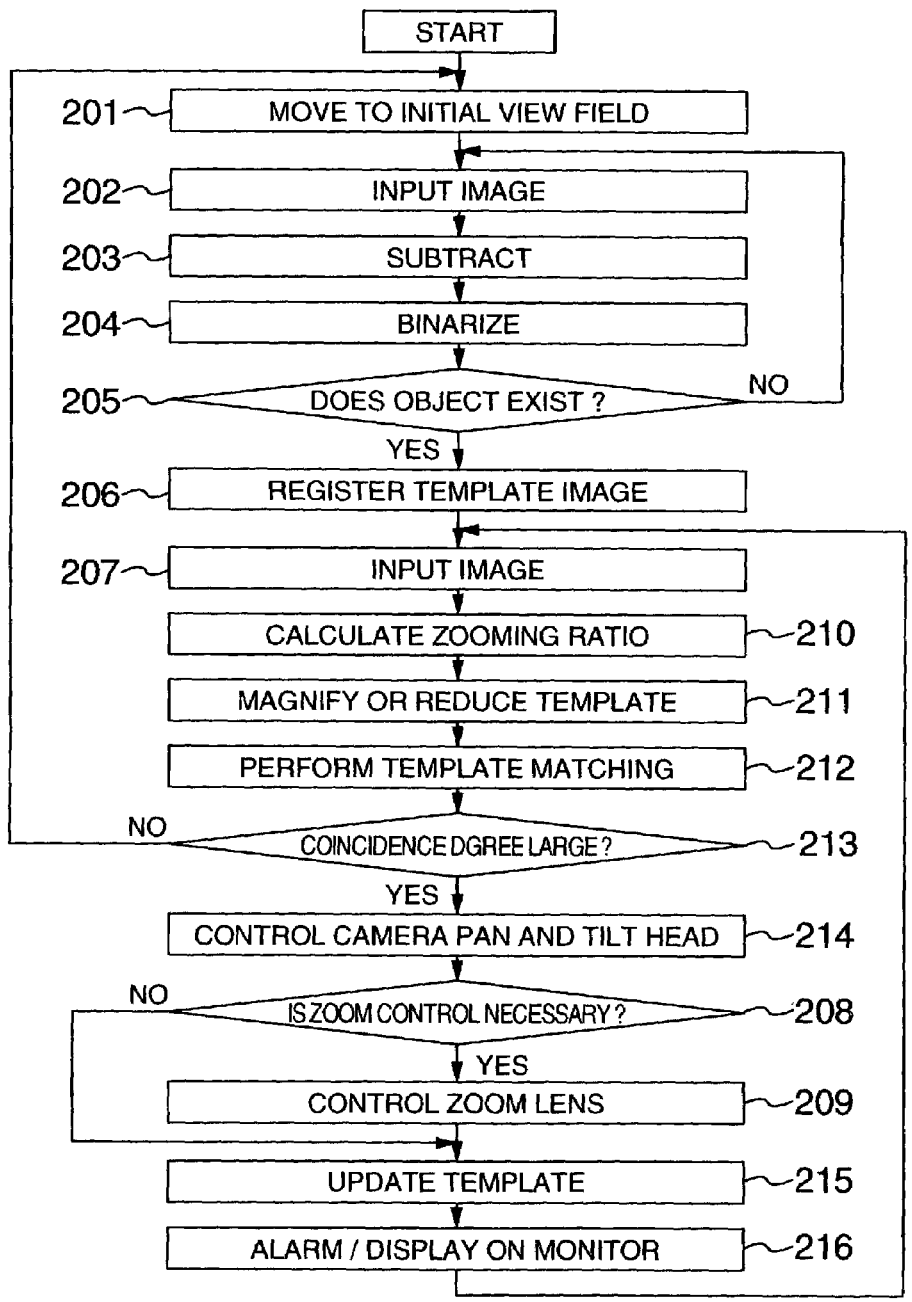
FIG. 7 is a flowchart illustrating a transformation of the process shown in FIG. 5.

In this embodiment, the image is zoomed in or out in the steps 208 and 209 and then is inputted into the step 202 or 207. Like the transformation shown in FIG. 7, the process of the steps 208 and 209 may be executed between the steps 214 and 215. This holds true to the second and the third embodiment to be discussed below.

The second embodiment of the invention will be now described with reference to FIG. 2. FIG. 10 is a flowchart illustrating the process of the second embodiment of the present invention. The process shown in FIG. 10 is arranged to have a zoom operation step 208' in place of the zoom control step 208 in the process described with reference to FIG. 5 and a zoom lens control step 209' in place of the zoom lens control step 209 therein. Hence, the other steps 201 to 207 and 210 to 216 are similar to those of the first embodiment, so that the description about those steps is left out.

When the process of the steps 201 to 207 is executed as described in FIG. 5, the process proceeds to a zoom operation determining step 208'.

In the zoom operation determining step 208', it is determined whether or not an operator handles the operation unit E04 on the basis of the output given through the operation input I/F E05d. If the operator handles the operation unit E04, the process proceeds to the zoom lens control step 209'. On the other hand, if the operator does not handle the operation unit, the process proceeds to the zooming ratio calculating step 210.

In the zoom lens control step 209', if the operator zooms in the lens through the operation unit E04, the focal distance of the zoom lens E02 is increased by a predetermined value (1 mm, for example). The zoom-in operation is executed when the operator depresses the first button E04b of the operation unit E04, for example. As an exemplary reference, each time the operator depresses the first button E04a of the operation unit E04 once, the focal distance of the zoom lens E02 is increased by a predetermined value.

If the operator zooms out the lens through the operation unit E04, the focal distance of the zoom lens E02 is decreased by a predetermined value (1 mm, for example). The zoom-out operation is executed when the operator depresses the second button E04b of the operation unit E04, for example. As an exemplary reference, each time the operator depresses the second button E04b of the operation unit E04 once, the focal distance of the zoom lens E02 may be decreased by a predetermined value.

If the operator zooms in and out the lens at a time, for example, the focal distance of the zoom lens E02 may be kept constant. This makes it possible for the operator to operate the zoom lens E02. Or, if the operator zooms in and out the lens at a time, the operation unit E04 may be arranged so that either one of the zoom-in and the zoom-out operations may be executed.

Hereafter, the process after the step 210 is executed.

The process allows the intruding object Z02f at time point T1+1, the intruding object Z03f at time point T1+2 and the intruding object in the input image to be tracked as handling the zoom lens E02.

As described above, according to the second embodiment of the present invention, in the zoom operation determining step 208' and the zoom lens control step 209', the process is executed to control the zoom lens on the basis of the operator's zooming operation. In the zooming ratio calculating step 210, the zooming ratio is calculated. Then, in the template magnification and reduction step 211, the template image is magnified or reduced on the zooming ratio. Hence, since the operator can operate the zoom lens as viewing the input screen displayed on the monitor E06, this process allows an intruding object to be accurately tracked without deviating the template image from the target intruding object and without lowering the degree of coincidence in the template matching.

In turn, the description will be oriented to the third embodiment of the present invention with reference to FIG. 11. FIG. 11 is a flowchart illustrating the process according to the embodiment of the present invention. The embodiment shown in FIG. 11 is a transformation of the second embodiment shown in FIG. 10. It is rearranged so that the zoom lens may be automatically controlled according to the size of the intruding object. That is, if the operator does not zoom in or out the lens, the zoom lens is automatically controlled so that the apparent size of the intruding object may be displayed in a predetermined size.

FIG. 11 shows the second embodiment shown in FIG. 10 additionally provided with a zoom control determining step 301 and a zoom lens control step 302.

The process of the steps 201 to 207, 208' to 209' and 210 to 215 are the same as those of the foregoing second embodiment. Hence, the description thereabout is left out.

In FIG. 11, the process of the zoom control determining step 301 is executed only when the operator does not zoom in or out the lens in the zoom operation determining step 208'.

In the zoom control determining step 301, if the size of the template image M03 of the intruding object being tracked is not fitted within the foregoing predetermined range, it is determined that the control of the zoom lens is required. Hence, the process is branched to the zoom lens control step 302. On the other hand, if the size of the template image M03 is fitted within the foregoing predetermined range, the process is branched into the zooming ratio calculating step 210.

According to the third embodiment of the present invention, in the zoom operation determining step 208' and the zoom lens control step 209', the zoom lens is controlled according to the operator's operation. If the operator does not operate the zoom lens, in the zoom control determining step 302 and the zoom lens control step 302, the zoom lens is controlled. Then, the zooming ratio is calculated in the zooming ratio calculating step 210. Next, in the template magnification and reduction step 211, the template image is magnified or reduced according to the zooming ratio. Hence, as the operator is operating the zoom lens, this embodiment allows an intruding object to be accurately traced without deviating the template image from the target intruding object and without lowering the degree of coincidence in the template matching.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An object detecting method for detecting an object in comparison between an input image from an image pick-up device having a zoom mechanism and a template image stored in memory, said object detecting method comprising the step of:
   storing a first image within a view field of said image pick-up device as said template image;
   recording a power of said zoom mechanism to be changed;
   pick-up a second image to be detected from said image pick-up device;
   changing a size of either one of said template image and said second image on the bases of said changed power of said zoom mechanism; and
   performing a template between said template image and said second image to detect said object,
   wherein the step of recording a power of said zoom mechanism to be changed comprises the steps of:
   storing a first focal distance of said zoom mechanism at a time when said template image is picked-up, and
   detecting a second focal distance of said zoom mechanism at a time when a second image from said image pick-up device is picked-up.

2. An object detecting method according to claim 1, wherein said step of storing said first image as said template image includes the steps of:
setting an area having a predetermined size containing said object and controlling said zoom mechanism so that said object is included in said area.

3. An object detecting method according to claim 1, wherein said step of performing a template matching is a step of detecting a position of a partial image with a maximum degree of coincidence with said template image from said second image.

4. An object detecting method according to claim 1, wherein said zoom mechanism is either one of a zoom lens and an electronic zoom.

5. An object detecting method according to claim 4, wherein said zoom mechanism is said zoom lens, and said object detecting method further comprises the steps of:
   changing manually said focal distances of said zoom lens and displaying said input image on a screen of a display,
   wherein an operator operates said zoom lens as viewing said input image on said screen.

6. An object detecting method according to claim 4, wherein said zoom mechanism is said zoom lens, the focal distance of said zoom lens is calculated after a passage of time from a predetermined reference time after a zoom control is started.

7. An object detecting method according to claim 1, said object detecting method further comprises the step of:
   updating said template image stored to a new template image on the bases of the results to perform a template matching.

8. An object detecting apparatus for detecting an object in comparison between an input image from an image pick-up device having a zoom mechanism and a template image stored in memory, said object detecting apparatus comprising:
   a storing unit for storing a first image within a view field of said image pick-up device as said template image;
   a recording unit for recording a power of said zoom mechanism to be changed;
   a picking-up unit for detecting a second image from said image pick-up device;
   a control unit for changing a size of either one of said template image and said second image on the bases of said changed power of said zoom mechanism; and
   a processing unit for performing a template matching,
   wherein said recording unit for recording a power of said zoom mechanism to be changed stores a first focal distance of said zoom mechanism at a time when said template image is picked-up and detects a second focal distance of said zoom mechanism at a time when a second image from said image pick-up device is picked-up.

9. An object detecting apparatus according to claim 8, wherein said control unit controls said zoom mechanism so that said first image as said template image includes an area having a predetermined size containing said object and said object is included in said area.

10. An object detecting apparatus according to claim 8, wherein said zoom mechanism is either one of a zoom lens and an electronic zoom.

11. An object detecting apparatus according to claim 10, wherein said zoom mechanism is said zoom lens, and said object detecting apparatus further comprises:
   means for changing manually said focal distance of said zoom lens and a display for displaying said input image, wherein an operator operates said zoom lens as viewing said input image on said display.

12. An object tracking method for tracking an object in comparison between an input image from an image pick-up device having a zoom mechanism and a template image stored in memory said object detecting method comprising the steps of:
 storing a first image within a view field of said image pick-up device as said template image;
 picking-up a second image to be detected from said image pick-up device;
 recording a power of said zoom mechanism to be changed;
 changing a size of either one of said template image and said second image on the bases of said changed power of said zoom mechanism;
 performing a template matching between said template image and said second image to detect said object; and
 controlling a moving mechanism of said image pick-up device in accordance with the results of said template matching so as to track said object,
 wherein the step of recording a power of said zoom mechanism to be changed comprises the steps of:
 storing a first focal distance of said zoom mechanism at a time when said template image is picked-up, and
 detecting a second focal distance of said zoom mechanism at a time when a second image from said image pick-up device is picked-up.

13. An object tracking method according to claim 12, wherein said step of storing said first image as said template image comprises the steps of:
 setting an area having a predetermined size containing said object and controlling said zoom mechanism so that said object is included in said area.

14. An object tracking method according to claim 12, wherein said step of performing a template matching is the step of detecting a position of a partial image with a maximum degree of coincidence with said template image from said second image from said image pick-up device.

15. An object tracking method according to claim 14, wherein said step of controlling a moving mechanism of said image pick-up device further comprises the step of:
 controlling said moving mechanism so that said object to be tracked positions around of the center of said view field of said image pick-up device.

16. An object tracking method according to claim 12, wherein said zoom mechanism is either one of a zoom lens and an electronic zoom.

17. An object tracking method according to claim 16, wherein said zoom mechanism is said zoom lens, and said object detecting method further comprises the steps of:
 changing manually said focal distances of said zoom lens and displaying said input image on a screen of a display,
 wherein an operator operates said zoom lens as viewing said input image on said screen.

18. An object tracking method according to claim 16, wherein said zoom mechanism is said zoom lens, the focal distance of said zoom lens is calculated after a passage of time from a predetermined reference time after a zoom control is started.

19. An object tracking method according to claim 12, said object detecting method further comprises the step of:
 updating said template image stored to a new template image on the bases of the results to perform a template matching.

20. An object tracking apparatus for tracking an object in comparison between an input image from an image pick-up device having zoom mechanism and a template image stored in memory, said object detecting apparatus comprising:
 a storing unit for staring a first image within a view field of said image pick-up device as said template image;
 a picking-up unit for picking-up a second image to be detected from said image pick-up device;
 a recording unit for recording a power of said zoom mechanism to be changed;
 a first control unit for changing a size of either one of said template image and said second image on the bases of said changed power of said zoom mechanism;
 a processing unit for performing a template matching between said template image and said second image to detect said object; and
 a second control unit for controlling a moving mechanism of said image pick-up device in accordance with the results of said template matching so as to track said object,
 wherein said recording unit for recording a power of said zoom mechanism to be changed stores a first focal distance of said zoom mechanism at a time when said template image is picked-up and detects a second focal distance of said zoom mechanism at a time when a second image from said image pick-up device is picked-up.

21. An object tracking apparatus according to claim 20, wherein said first control unit controls said zoom mechanism so that said first image as said template image includes an area having a predetermined size containing said object and said object is included in said area.

22. An object detecting apparatus according to claim 20, wherein said zoom mechanism is either one of a zoom lens and a an electronic zoom.

23. An object detecting apparatus according to claim 22, wherein said zoom mechanism is said zoom lens, and object detecting apparatus further comprises:
 means for changing manually said focal distances of said zoom lens and a display for displaying said input image, wherein an operator operates said zoom lens as viewing said input image on said display.

* * * * *